W. J. KIRKPATRICK & G. W. FARLEY.
NEWSPAPER SUPPLEMENTING OR INSERTING MACHINE.
APPLICATION FILED NOV. 2, 1915.

1,223,398.

Patented Apr. 24, 1917.
7 SHEETS—SHEET 1.

Witnesses

W. J. Kirkpatrick and
G. W. Farley
Inventors
by C. A. Snow & Co.
Attorneys.

W. J. KIRKPATRICK & G. W. FARLEY.
NEWSPAPER SUPPLEMENTING OR INSERTING MACHINE.
APPLICATION FILED NOV. 2, 1915.

1,223,398.

Patented Apr. 24, 1917.
7 SHEETS—SHEET 3.

Witnesses

Inventors
W. J. Kirkpatrick and
G. W. Farley
by C. A. Snow & Co.
Attorneys.

W. J. KIRKPATRICK & G. W. FARLEY.
NEWSPAPER SUPPLEMENTING OR INSERTING MACHINE.
APPLICATION FILED NOV. 2, 1915.
1,223,398.
Patented Apr. 24, 1917.
7 SHEETS—SHEET 6.
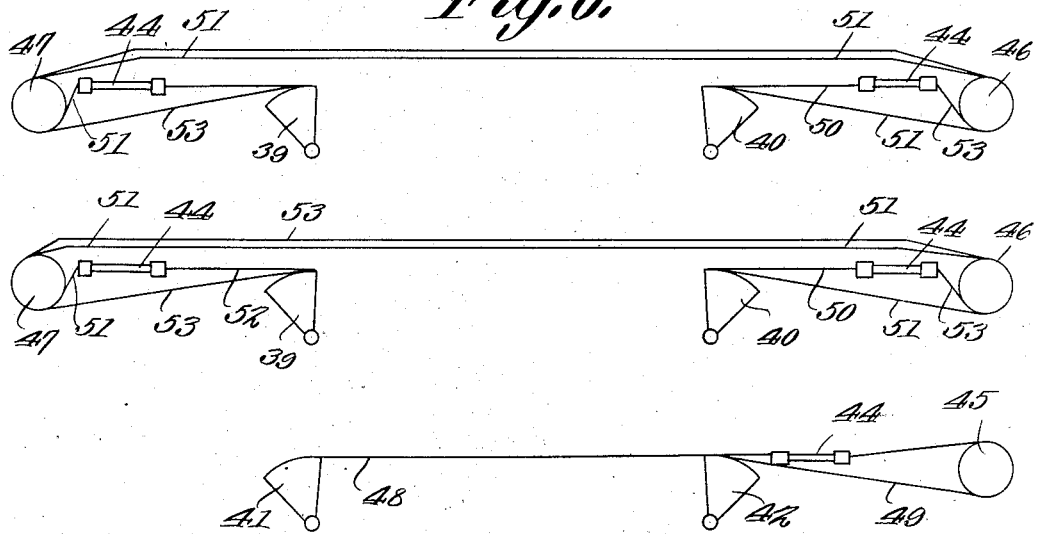
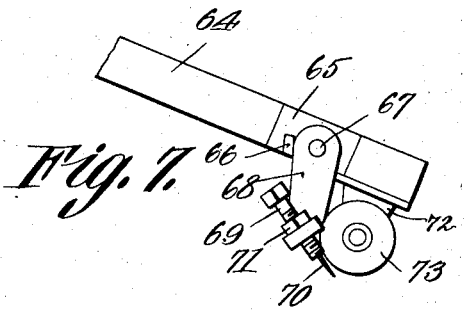
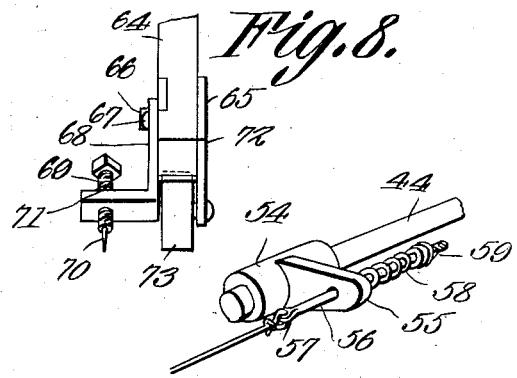
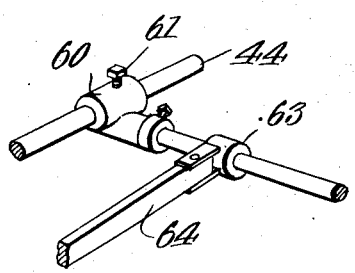
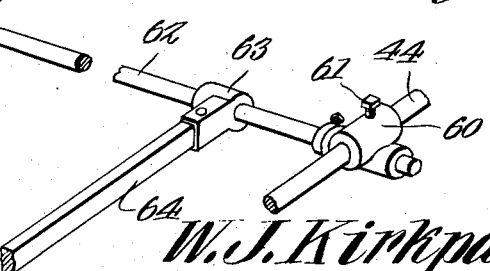
Witnesses
W. J. Kirkpatrick
G. W. Farley
Inventors
by C. A. Snow & Co.
Attorneys.

W. J. KIRKPATRICK & G. W. FARLEY.
NEWSPAPER SUPPLEMENTING OR INSERTING MACHINE.
APPLICATION FILED NOV. 2, 1915.

1,223,398.

Patented Apr. 24, 1917.

Witnesses

Inventors
W. J. Kirkpatrick
G. W. Farley by C. A. Snow & Co.
Attorneys.

UNITED STATES PATENT OFFICE.

WILLIAM J. KIRKPATRICK AND GEORGE W. FARLEY, OF EUREKA, CALIFORNIA, ASSIGNORS OF ONE-THIRD TO IRA MULLEN, OF EUREKA, CALIFORNIA.

NEWSPAPER SUPPLEMENTING OR INSERTING MACHINE.

1,223,398.  Specification of Letters Patent.  Patented Apr. 24, 1917.

Application filed November 2, 1915. Serial No. 59,283.

*To all whom it may concern:*

Be it known that we, WILLIAM J. KIRKPATRICK and GEORGE W. FARLEY, citizens of the United States, residing at Eureka, in the county of Humboldt, State of California, have invented a new and useful Newspaper Supplementing or Inserting Machine, of which the following is a specification.

The device forming the subject matter of this application is adapted to be employed for assembling a newspaper composed of a cover and inserts.

A plurality of covers are placed in a pile and a plurality of inserts are placed in a pile. One cover from the pile, in a folded condition, is advanced to move downwardly, the cover being opened, so as to receive the insert, the latter being fed into the cover after the cover has been opened.

The invention aims to provide novel means for moving the bundles of inserts and covers as an entity, and to provide a mechanism whereby the said means may be governed.

A further object of the invention is to provide novel means whereby one cover at a time or one insert at a time is advanced.

The invention aims to improve the means whereby the cover is received and opened to take an insert and to improve the means whereby the cover and the inserts therein may be discharged after the paper has been assembled.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Fig. 6 is a diagrammatic view, illustrating the flexible elements whereby the sheet feeders are actuated;

Fig. 7 is a side elevation showing a portion of one of the feeding arms;

Fig. 8 is an elevation of the structure shown in Fig. 7;

Fig. 9 is a fragmental perspective showing the means whereby the flexible elements are connected with the slide rods of the feeding mechanisms;

Fig. 10 is a detail view showing a portion of the sheet feeding mechanism.

Figure 1:
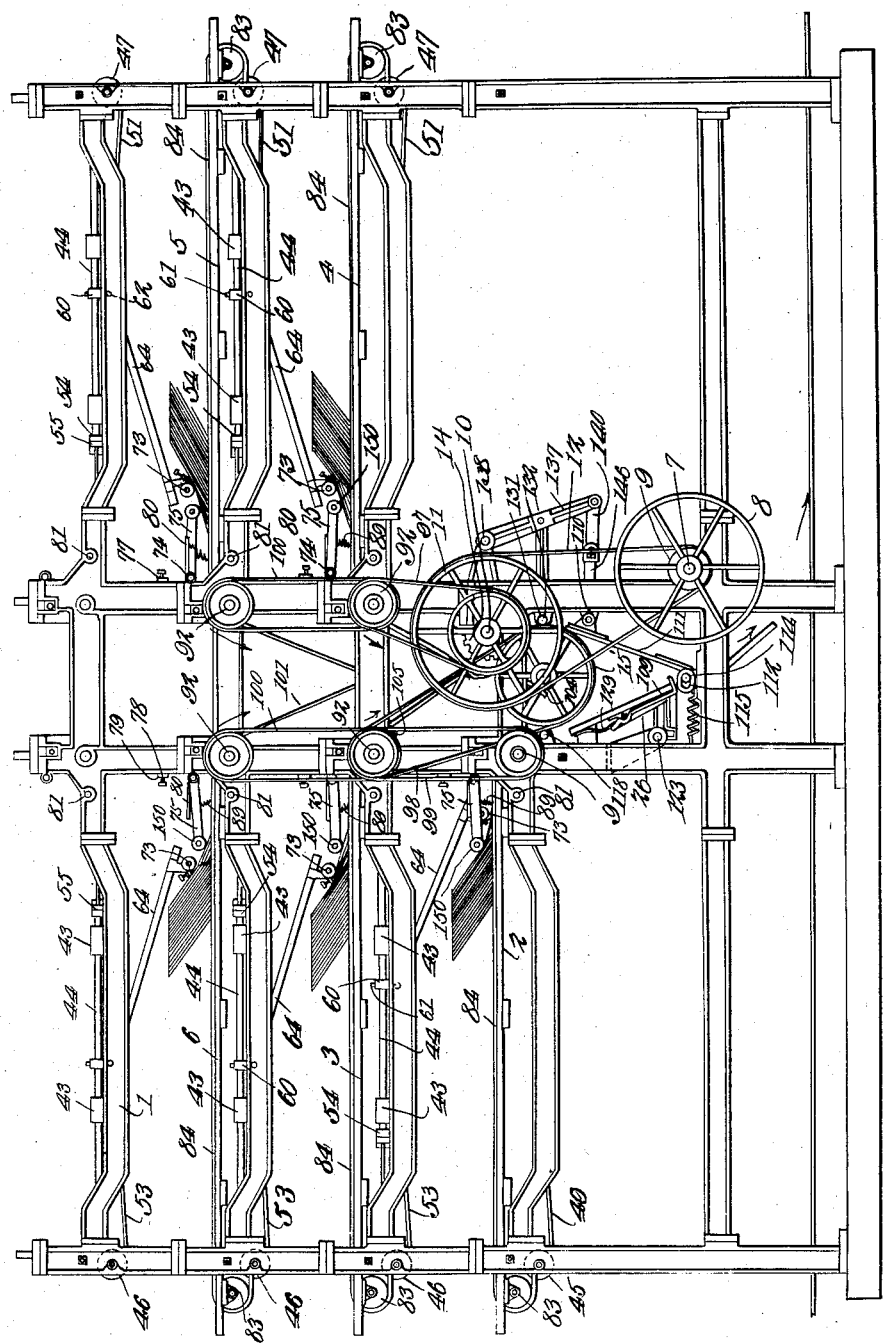
Figure 1 shows the invention in side elevation.
Figure 2:
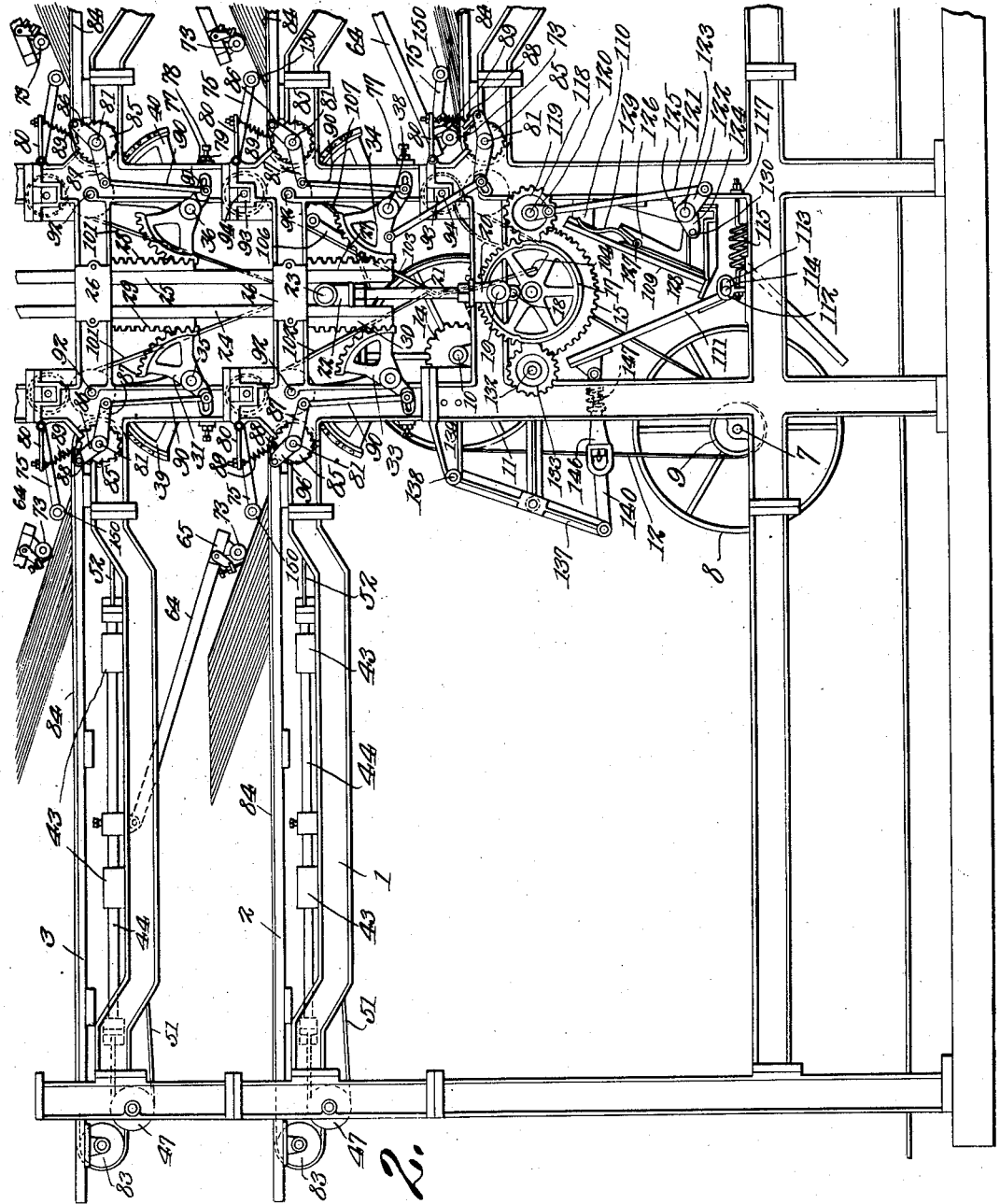
Fig. 2 is a fragmental elevation disclosing a portion of the opposite side of the device from that delineated in Fig. 1.

In carrying out the present invention there is provided a supporting frame 1 which need not be described in detail, since its structure may be varied without jeopardizing the utility of the invention. The frame 1 supports tables 2, 3, 4, 5 and 6. Any desired number of tables may be used, depending upon the number of sections out of which the newspaper is made, and although five tables are shown, more or less than this number may be resorted to. The tables 2, 3 and 6 are superposed and are located to one side of the center of the machine, as Fig. 1 will show, the tables 4 and 5 being located upon the opposite side of the center of the machine. That section of the newspaper which forms the outside or cover is delivered from the table 2, is opened into V-shape, and the other sections, delivered from the tables 3, 6, 5 and 4, being disposed side by side, pass downwardly into the outside or cover section from the table 2, in a manner which will be manifest as the description of the invention proceeds.

Figure 3:
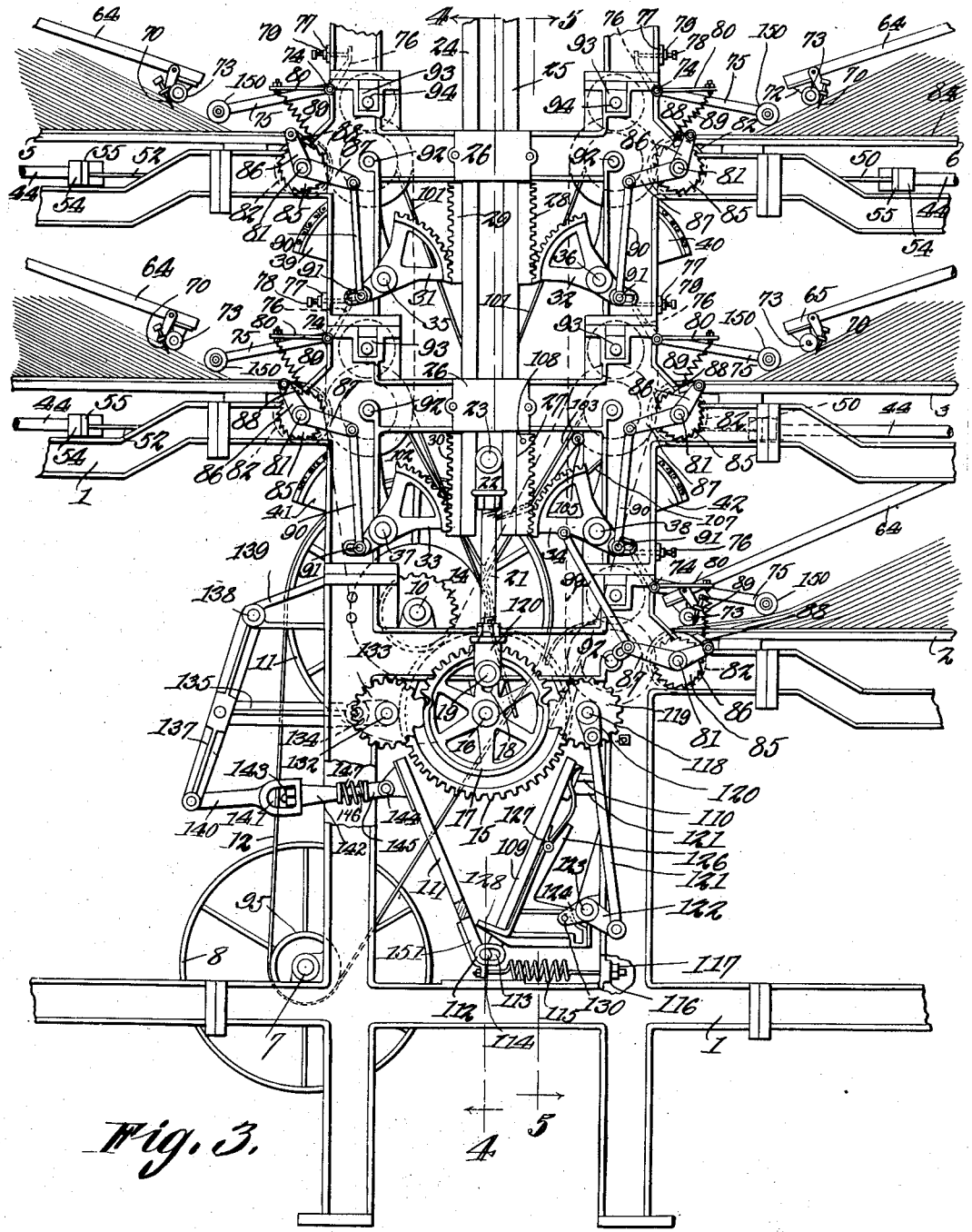
Fig. 3 is an elevation, enlarged from Fig. 2.

Journaled for rotation in the supporting frame 1 at one side thereof is a drive shaft 7 carrying a pulley 8 or other suitable means whereby the drive shaft may be operated from a prime mover. The drive shaft 7 carries a pulley 9. The numeral 10 designates a shaft journaled for rotation in the frame 1 and carrying a pulley 11, the pulley 11 being operatively connected with the pulley 9 by means of a belt 12. Fixed to the shaft 10 is a pinion 14 meshing into a gear wheel 15 on a shaft 16 extended entirely across the supporting frame 1. Fixed to the shaft 16 is an interrupted gear 17 shown to best advantage in Fig. 3 and located on the opposite side of the supporting frame 1 from the driving belts and pulleys hereinbefore described. For the present, the fact that the wheel 17 is provided with an interrupted gear may be disregarded, the part 17 being considered merely as a crank element operatively connected with the shaft 16.

The wheel 17 is slotted as indicated at 18 to afford an adjustable mounting for a crank pin 19 carried by a socket 20. The numeral 22 indicates a second socket and into the sockets 20 and 22 are right and left hand threaded ends of a pitman 21, the parts 20, 21 and 22 forming a connection the length of which may be adjusted in an obvious manner. The socket 22 is mounted to rock on a wrist pin 23 carried by a pair of vertically disposed sliding rods 24 and 25 mounted to reciprocate in guides 26 on the supporting frame 1. The rod 25 carries racks 28 and 27, the rod 24 carrying racks 29 and 30, it being understood that the racks 28 and 29 are duplicated to any desired extent, depending upon the number of vertically superposed tables of which the machine consists. The racks 29 coöperate with gear sectors 31, the racks 28 coact with gear sectors 32, the racks 30 drive gear sectors 33 and the racks 27 coöperate with gear sectors 34. Journaled for rotation in the supporting frame 1 is a shaft 35 carrying the gear sectors 31, the shaft of the gear sectors 32 being shown at 36. The numeral 37 designates the shaft of the gear sectors 33 and the numeral 38 indicates the shaft of the gear sectors 34.

The shaft 35 carries sectors 39, the shaft 36 is provided with sectors 40, sectors 41 are mounted on the shaft 37 and the shaft 38 is equipped with sectors 42. The numeral 43 indicates guides on the frame 1 and in the guides 43 are mounted to reciprocate slide rods 44. Mounted on the frame 1 adjacent the ends thereof are idlers 45, above which are disposed any desired number of idlers 46, reference being had particularly to Fig. 6 for a clear understanding of details to be described hereinafter. The other end of the frame 1 carries idlers 47, located in horizontal alinement with the idlers 46. Flexible elements 48 are secured at one end to the sectors 41, the other ends of the flexible elements 48 being attached to the inner ends of those slide rods 44 which lie above the table 2 and are located immediately below the table 3. Flexible elements 49 are secured to the outer ends of the slide rods 44 which operate above the table 2, the flexible elements 49 being carried around the idlers 45 and being secured to the sectors 42. Flexible elements 50 are attached at their inner ends to the sectors 40, and are attached at their outer ends to those slide rods 44 which coact with the table 3 and lie below the table 6. Flexible elements 51 are secured at their inner ends to the sectors 40, the flexible elements 51 being passed around the idlers 46 and around the idlers 47, the flexible elements 51 being connected to the outer ends of those side rods 44 which operate above the table 4. Flexible elements 53 are secured to the outer ends of the slide rods 44 which operate above the table 3, the flexible elements 53 being trained around idlers 46 and 47 and being secured to the sectors 39. Flexible elements 52 connect the sectors 39 with the slide rods 44 which operate above the table 4.

The flexible elements may be assembled with the slide rods 44 by such a mechanism as that indicated in Fig. 9, wherein the numeral 54 indicates a head on the slide rod, the head being equipped with a rib 55 in which reciprocates a rod 56 secured as indicated at 57 to the flexible element. The rod 56 passes through a coiled compression spring 58 abutting against the rib 55, the effort of the spring 58 being adjusted by means of a nut and washer 59 on the rod 56. The construction above outlined provides a means whereby the flexible elements may be yieldingly connected with the slide rods. The slide rods 44 of each pair carry cross head members 60 held in place for adjustment by means of set screws 61. In the cross head members 60 is located a shaft 62 united by means of adjustable connections 63 with inclined arms 64 carrying as shown best in Figs. 7 and 8, holders 65 having stops 66. Pivoted at 67 to the holders 65 are hangers 68 adapted to coact with the stops 66, and mounted on the hangers 68 for adjustment are receivers 69 held in place by lock nuts 71 and carrying needles 70. The arms 64 are provided with brackets 72 on which are journaled for rotation, rollers 73.

Journaled in the frame 1 are governor shafts 74 carrying governor arms 75 equipped with rollers 150. The governor arms 75 are provided with upstanding extensions 76 adapted to be engaged for purposes of adjustment by screws 78 threaded into bars 77 on the frame 1 the screws being held in place by lock nuts 79. The governor shafts 74 are provided at one side of the machine with arms 80. Journaled in the frame 1 are shafts 81 provided with rollers 82. Idle rollers 83 are journaled in the frame 1 adjacent its ends, and about the rollers 82 and 83 are passed belts 84, there being one of the above mentioned belts for each of the tables 2, 3, 4, 5 and 6. Secured to the shafts 81 are ratchet wheels 85. Mounted to swing on the shafts 81 are levers each comprising an arm 86 and an arm 87. The arms 87 carry pivoted pawls 88 adapted to coact with the ratchet wheels 85, springs 89 being extended between the pawls 88 and the arms 80 on the governor shafts 74. Pivoted to the arms 87 are connecting rods 90, the lower ends of which are united by adjustable connections 91 to the gear sectors 31, 32, 33 and 34. As clearly shown in Fig. 3, the connecting rod which extends downwardly from the sector 34 to the pawl and ratchet mechanism adjacent the table 2 is disposed on the opposite side of the shaft 38 from the connecting rod which operatively unites the sector 34 with the pawl and ratchet mechanism which is located adjacent the table 3. The reason for this construction will be made manifest hereinafter.

Figure 4:
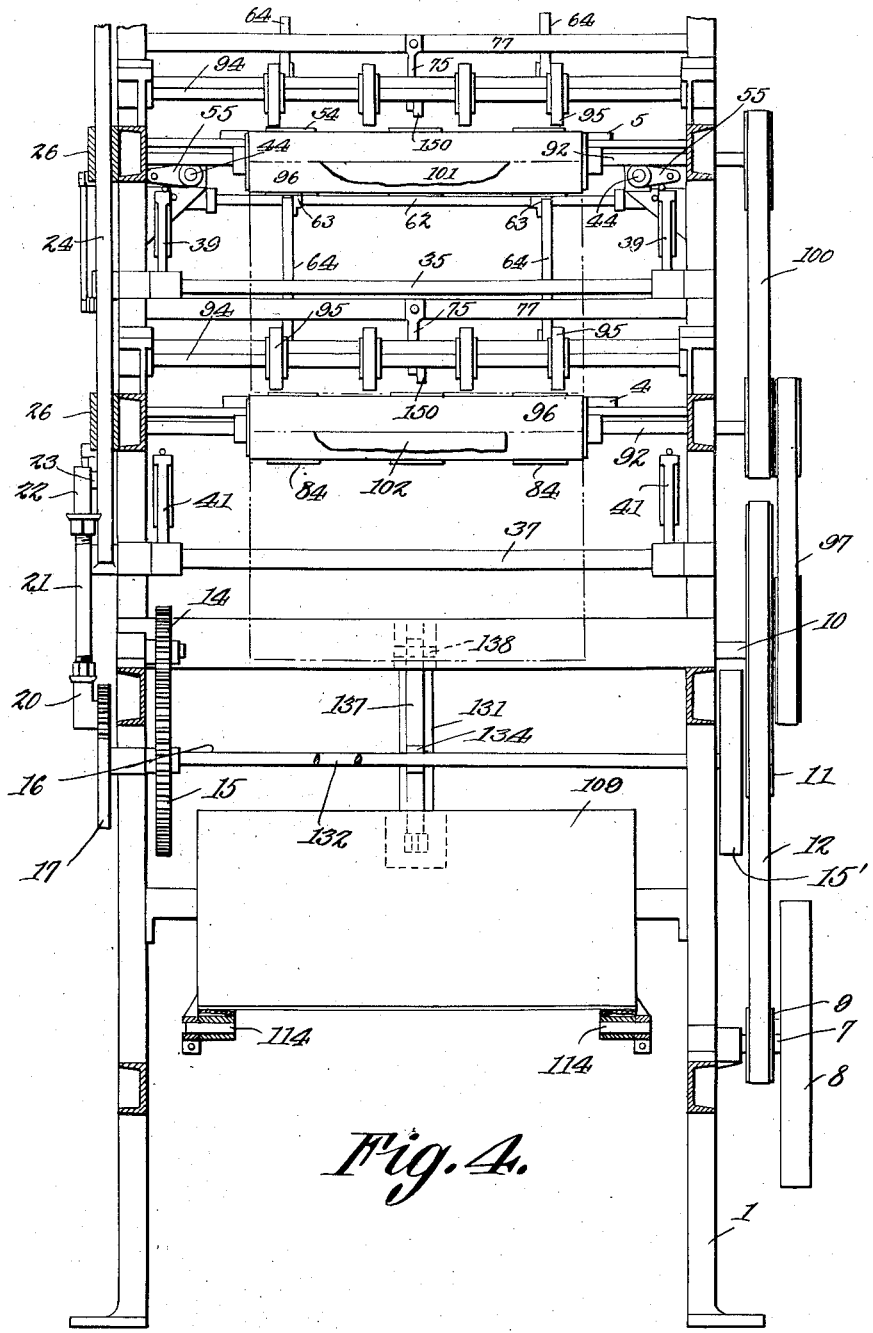
Fig. 4 is a cross section on the line 4—4 of Fig. 3.
Figure 5:
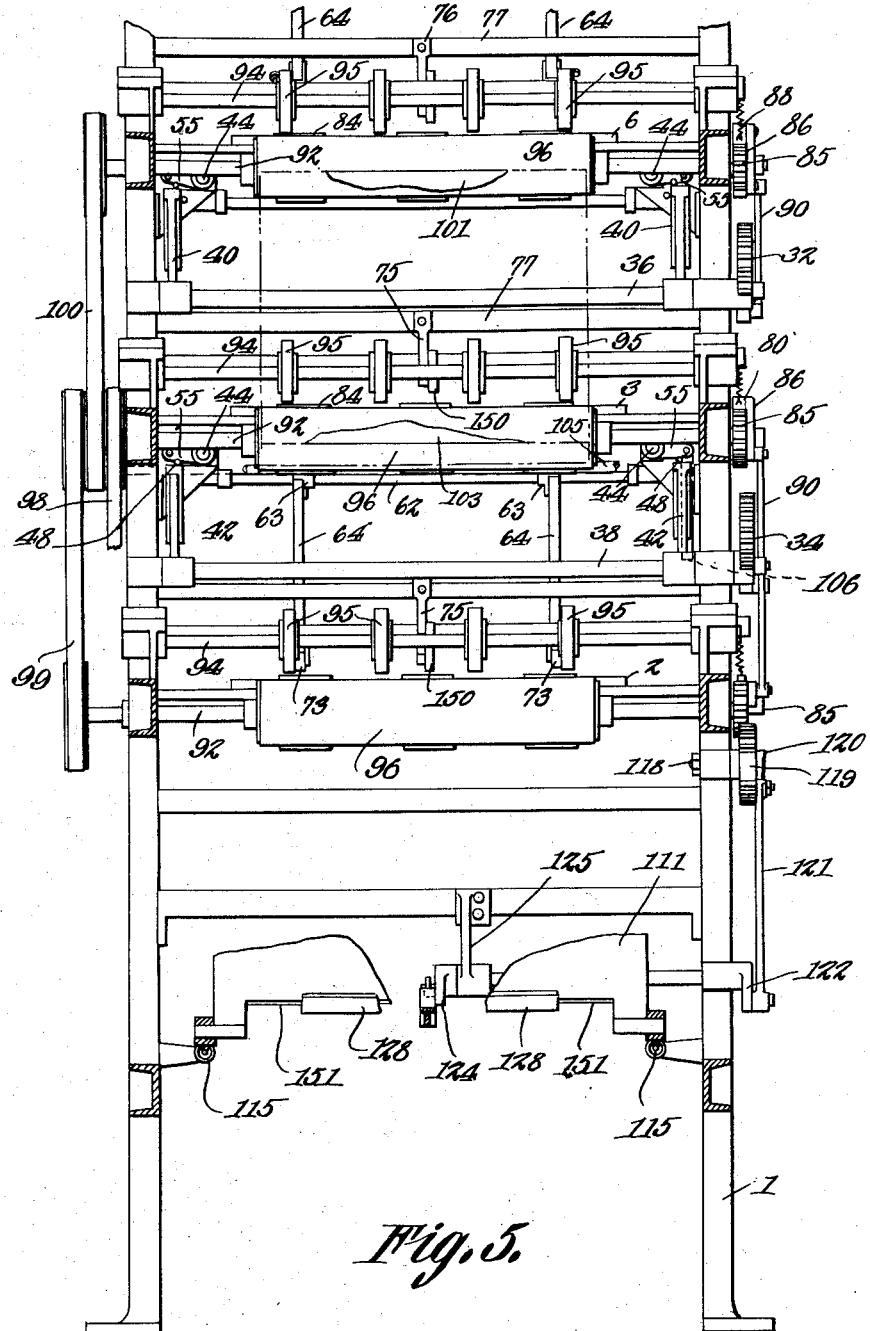
Fig. 5 is a cross section on the line 5—5 of Fig. 3.
Figure 11:
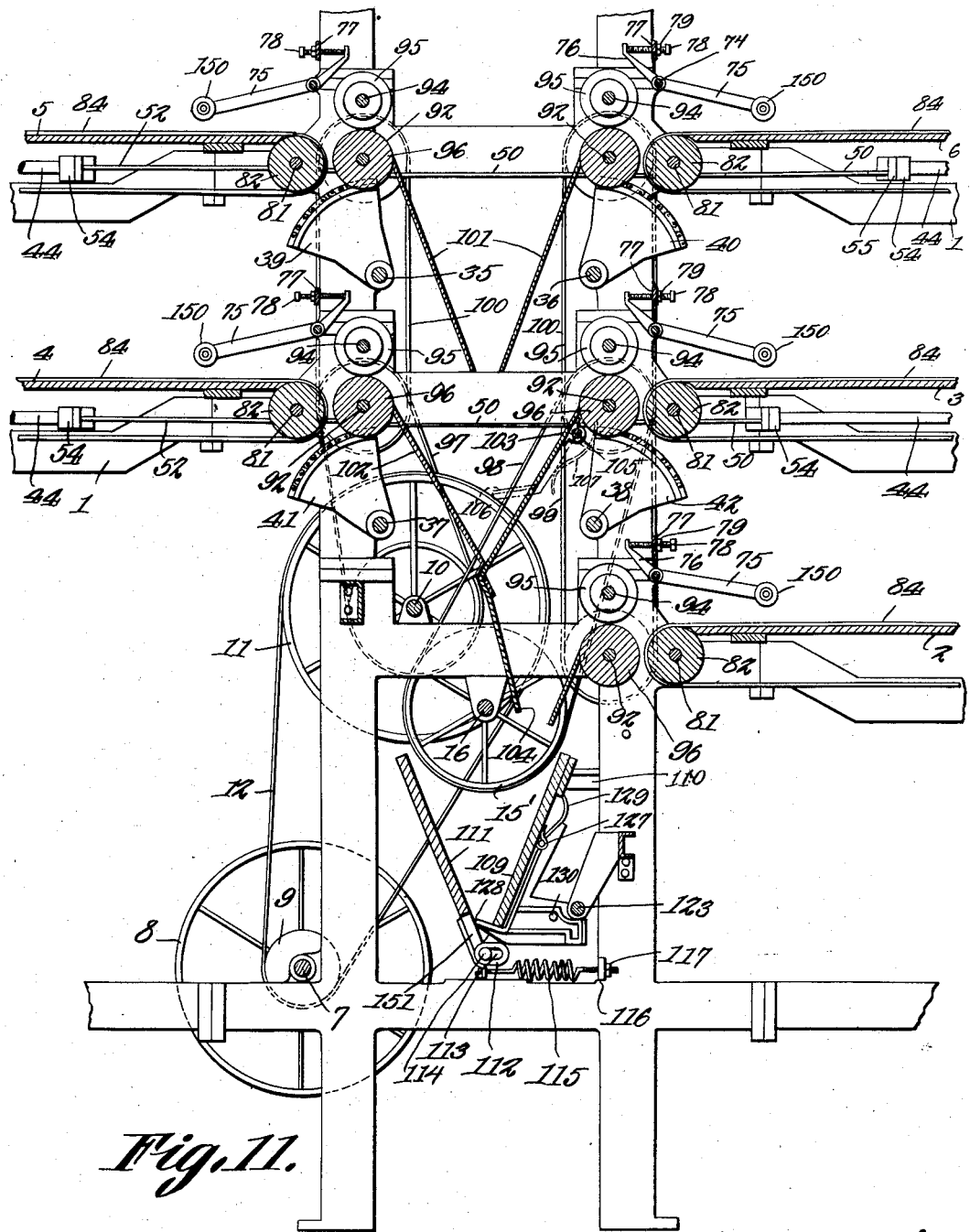
Fig. 11 is a fragmental longitudinal vertical section.

Journaled for rotation in the frame 1 are shafts 92 carrying driving rollers 96. Slidable vertically in the frame 1 are bearings 93 carrying shafts 94 equipped with gravity rollers 95 which coact with the rollers 96. As will be understood from Fig. 1 when compared with Fig. 4, the shaft 92 adjacent the table 4 is driven by a belt 97 operatively connected with the shaft 10, the shaft 92 adjacent the table 3 is driven by a belt 98 from the shaft 16, the shaft 92 adjacent the table 2 being driven by a belt 99 from the shaft 92 adjacent the table 3, and the shafts 92 adjacent the tables 6 and 5 are driven by belts 100 from the shafts 92 adjacent the tables 3 and 4.

The folded newspaper sections on the tables 5 and 6 pass by way of a chute 101 into a retarding chute which will now be described in detail, the retarding chute comprising a plate 102 carried by the frame 1 and a plate 103 having an extension 104 prolonged below the plate 102. The plate 103 is carried by a shaft 105 journaled in the machine frame and provided with a lever arm 106 there being a spring 107 on the machine frame which, coacting with the plate 103 maintains the same in closed relation with respect to the plate 102. The lever arm 106 projects into the path of a pin 108 on the rack 27, the construction being such that when the rods 24 and 25 descend, the pin will engage with the lever arm and swing the movable plate 103 into open position with respect to the plate 102, thereby permitting the newspaper sections which have accumulated at the angle defined by the plates 102 and 103 to pass into a receptacle which will now be described, the receptacle comprising a fixed side 109 and a movable side 111, these two parts defining an angle in which the outside or cover section of the newspaper has been placed previously, and been opened, in a manner which will be set forth hereinafter. The fixed side 109 of the receptacle is held to the machine frame 1 by means of brackets 110. The movable side 111 of the receptacle is equipped with hinge members 112 having transverse slots 113 receiving pins 114 on the fixed section 109. Springs 115 are connected at one end with the movable side 111 of the receptacle, the springs passing through a cleat 116 on the machine frame, nuts 117 being threaded on the ends of the springs, adapted to engage the cleat 116 to the end that the effort of the springs may be adjusted.

Mounted in the frame 1 of the machine is a shaft 118, carrying an interrupted pinion 119 which meshes into the interrupted gear wheel 17. The shaft 118 may carry an arm 120 which is pivoted to a connecting rod 121 united with an arm 122, on one end of a shaft 123 journaled on the machine frame and extended toward the center thereof, the shaft 123 being supported in a suitable bearing 125 and being provided adjacent the center of the machine with a crank arm 124. A lever 126 is fulcrumed intermediate its ends as shown at 127, on the rear face of the plate 109 and terminates in a forwardly presented stop finger 128 projecting through an opening in the plate 109, the plate 111 being cut away as indicated at 151, to accommodate the finger 128, when the parts 111 and 109 are brought together. A spring 129 coacts with the upper end of the lever 126 and with the rear face of the plate 109 and serves to maintain the finger 128 in the advanced position shown in Fig. 3. The lever 126 is pivoted as shown at 130 to the arm 124.

Depending from the framework of the machine and constituting a part thereof is a hanger 131 carrying a shaft 132 equipped with an interrupted pinion 133 adapted to mesh into the interrupted gear wheel 117. Adjacent the center of the machine, the shaft 132 is equipped with a crank 134 united by a connecting rod 135 to the intermediate portion of a radius rod 137 carried by a cross shaft 138 mounted in bearings 139 on the side portions of the machine frame. Pivoted to the lower end of the radius rod 137 is a rod 140 having a recess 141 and terminating in a socket 142, the recess 141 receiving a nut 143 on the end of a rod 146 mounted in a socket 145 pivoted as shown at 144 to the rear face of the plate or movable side 111 of the receptacle. A compression spring 147 is interposed between the sockets 145 and 142.

In practical operation, a bundle of the sections which are to form the outside of a complete newspaper are placed on the belt 84 which coacts with the table 2, the other parts of the newspaper, all in folded condition, are placed upon the belts which coact with the tables 3, 6, 5 and 4. If the drive shaft 7 is rotated by means of the pulley 8 or its equivalent, then there is established a driving train comprising the pulley 9, the belt 12, the pulley 11, the shaft 10, the pinion 14, the gear wheel 15, the shaft 16 and the interrupted gear 17, the latter through the connecting rod comprising the parts 20, 21 and 22 imparting a vertical reciprocating movement to the rods 24 and 25 and to the racks 27, 28, 29 and 30 carried by the respective rods. The gear sectors, 31, 32, 33 and 34 are actuated by the intermeshing racks, and the shafts 35, 36, 37 and 38 are rocked, the sectors 39, 40, 41 and 42 being actuated. Noting Fig. 6 and observing the lay out of the various flexible elements 48, 49, 50, 51, 52 and 53, it will be understood that the slide rods 44 will be moved toward and away from the center of the machine, each pair of slide rods actuating its feeding arms 64. When the feeding arms 64 which coact with the table 2 carrying the sections which form the outside of the newspaper are moved toward the center of the machine, the other feeding arms 64 will be retracted, this operation resulting from the arrangement of flexible elements shown in Fig. 6. The outside section of the newspaper therefore will be fed off the belt 84 which coacts with the table 2 and will pass into the receptacle comprising the plates or sections 109 and 111, the other sections of the newspaper being fed down into the retarding chute comprising the plates 102 and 103, these plates being in closed relation to each other, and the bundle of newspaper sections (excepting the outside section) being held until the retarding chute is opened in a manner to be set forth hereinafter.

When the arms 64 are moved in a manner hereinbefore described, toward and away from the center of the machine, the rollers 73 travel over the bundles of papers. As the arms 64 are advanced toward the center of the machine, the needles 70 work into a section and advance the same, the hangers 68 being in abutment with the stops 66. When, however, the arms 64 are retracted away from the center of the machine, the hangers 68 swing on the pivots 67 away from the stops 66 and the needles 70 do not prick into or tear the newspaper sections.

After the newspaper sections have been advanced sufficiently by the rods 64 and their needles 70, the sections are engaged between the driven rollers 96 and the gravity rollers 95. By these elements, the newspaper sections are fed downwardly as hereinbefore mentioned. The shaft 92 adjacent the table 2 is driven from the shaft 92 adjacent the table 3 by means of the belt 99, the shaft 92 adjacent the table 3 being driven from the shaft 16 by means of the belt 98 and the shaft 92 adjacent the table 6 being driven from the shaft 92 adjacent the table 3 by means of the belt 100. The shaft 92 adjacent the table 5 is driven from the shaft 92 adjacent the table 4 by means of the belt 100 and the shaft 92 adjacent the table 4 is driven from the shaft 10 by means of the belt 97.

Each entire bundle of newspaper sections is advanced slowly when the belts 84 are moved, a step-by-step movement being imparted to the belt 84 from the shaft 81 by means of the ratchet wheel 85, the pawl 88, the lever 86—87, the connecting rod 90 and the appropriate one of the gear sectors 31, 32, 33 and 34. Since the feeding arms 64 of the table 2 are in advanced position when the feeding arms peculiar to the other tables are retracted, a reversal of the action of the bundle feeding mechanism peculiar to the table 2 must be brought about, and in this connection it is to be observed that the connecting rods 90 which extend, respectively, upwardly and downwardly from the sector 34 are pivoted to the said sector upon opposite sides of its axis 38 of swinging movement.

A continuous feed of the bundles, by moving the belts 84 is not desirable and is prevented by the action of the governor mechanism. When the rollers 150 on the ends of the arms 75 ride up on the bundle of papers, the governor shafts 74 are rocked and the arms 80 on the shafts are actuated, the springs 89 bringing the pawls 88 out of engagement with the ratchet wheels 85 and preventing a positive forward feed of the belts 84 until a time when the bundle has been depleted sufficiently by the action of the arms 64 to permit the governor arm 75 to move downwardly, whereupon the arms 80 will be lowered, and the pawls 88 will be permitted again to engage with the ratchet wheels 85.

The outside section of the newspaper which is delivered into the receptacle 111—109 from the belt 84 which coacts with the table 2 is received in such receptacle in closed condition and it is necessary to open the section. When the interrupted gear 17 is rotated by means of the shaft 16, the gear 17 intermeshes with the interrupted pinion 133 and rotates the same, the shaft 132 being rotated, the crank 134 through the medium of the connecting rod 135 imparting swinging movement to the radius rod 137, the same through the means of the member 140—142 swinging the plate 111 to the right in Fig. 3 and pressing the outside newspaper section together closely between the plates 109 and 111. The air thus is expelled from between the plates 111 and 109 and the folded outside newspaper section, and when the plate 111 is retracted into the position shown in Fig. 3, the newspaper section will be opened out into V-shape so as to receive the other sections of the paper, so soon as the latter are released from the retarding chute comprising the plates 102 and 103. Owing to the fact that the spring 147 is provided, a yielding pressure is secured and since the spindles 114 on the part 109 are movable in the slots 113 of the hinge members 112 on the plate 111, the operation of opening the outside section of the newspaper will be brought about without regard to the thickness of the same. The spring 115 serves to maintain the parts 111 and 109 of the receptacle in the positions shown in Fig. 3.

After the outside section of the newspaper has been deposited in the receptacle 109—111 and has been opened, the other sections of the newspaper which in folded condition, lie in the retarding chute 102—103, must be released, so as to pass into the open, outer section of the newspaper. Such an operation is brought about as follows:—When the rod 25 descends, the pin 108 comes into contact with the lever arm 106 of the shaft 105 of the plate 103 of the retarding chute, and this plate is moved to the right in Fig. 3, the chute being opened, so that the folded newspaper sections therein may pass downwardly into the opened outer section in the receptacle 111—109, the spring 107 serving to restore the plate 103 to the closed position of Fig. 3.

After the paper has been assembled in the receptacle 111—109 in the manner hereinbefore set forth, the finger 128 must be retracted if the paper is to pass out of the receptacle 111—109. When the interrupted gear 17 is rotated, it imparts rotation to the interrupted pinion 119, the latter through the medium of the connecting rod 121 on the arm 120 imparting rocking movement to the shaft 123, the arm 124 of which, coacting with the lever 126, tilts the same on its fulcrum 127 and withdraws the finger 128 so that the paper may pass downwardly onto any suitable delivery means, the spring 129 aiding in restoring the finger 128 to the position shown in Fig. 3.

Having thus described the invention, what is claimed is:—

1. In a machine for assembling a newspaper composed of a cover and an insert, a lower means for supporting covers; oppositely disposed upper means for supporting separate inserts; an opener; means for feeding a cover from the cover supporting means into the opener; means for operating the opener to spread the cover; means for positively accumulating a plurality of unopened inserts side by side directly above the opener; means for advancing an insert from each of the insert supporting means into the accumulating means; and mechanism for operating the accumulating means to permit the inserts to fall by gravity in an unopen condition into the cover which has been spread in the opener.

2. In a machine for assembling a newspaper composed of a cover and inserts, means for supporting a plurality of covers in folded condition; means for receiving and opening a cover; mechanism for advancing one cover at a time from the supporting means into the receiving and opening means; means for supporting the inserts in separate bundles; mechanism for advancing the inserts from the respective bundles to a position directly above the receiving means; mechanism for holding the inserts from the respective bundles until an insert has been delivered from each bundle; and means for releasing said mechanism to permit the inserts to fall by gravity into the cover after the same has been opened by the receiving means.

3. In a machine for assembling a newspaper composed of a cover and inserts, means for supporting a plurality of covers in folded condition; means for receiving and opening a cover; mechanism for advancing one cover at a time from the supporting means into the receiving and opening means; separate means for supporting the inserts; separate mechanisms for advancing the inserts into the cover after the cover has been opened by the receiving means; and means for operatively connecting the cover advancing means and both of the insert advancing means whereby the cover advancing means will be in advanced position while the insert advancing means is in retracted position, thereby to effect a feeding of the cover into the receiving means prior to the feeding of the inserts into the cover.

4. In a device of the class described, a support; a mutilated gear wheel journaled on the support; shafts journaled on the support and provided with cranks; interrupted pinions on the shafts and meshing into the gear wheel; a radius rod mounted to swing on the support; an opener comprising relatively movable parts; a stop movably mounted on one part of the opener and operable between the parts of the opener; a connection between the stop and one of the cranks; a connection between the radius rod and the other of the cranks; and a connection between the radius rod and the other part of the opener.

5. In a machine for assembling a newspaper composed of a cover and inserts, a cover receiving means; an insert retarding means located above the cover receiving means and comprising a movable member; insert feeding means discharging into the retarding means; mechanism for actuating the feeding means; and interengaging elements on said mechanism and the movable member of the retarding means coacting to effect an opening of the retarding means.

6. In a machine for assembling a newspaper composed of a cover and inserts, a supporting structure; a rack bar mounted to slide therein; a segment meshing into the rack bar; insert feeding means operatively connected with the segment; an insert retarder into which the feeding means discharges and including a movable member; interengaging elements on the said movable member and on the rack bar coacting to open the retarder when the rack bar is actuated; and a cover receiver to which the insert retarder discharges.

7. In a device of the class described, a support; shafts journaled therein; means for operating both shafts at once; segments carried by the shafts; idlers on the support; feeders disposed between the idlers and the respective shafts; flexible connections between the inner ends of the feeders and the respective adjacent segments; flexible elements trained about the idlers, one end of each of the last specified flexible elements being connected to the outer end of one feeder, and the other end of each flexible element being connected to the segment to which the inner end of the other feeder is connected.

In testimony that we claim the foregoing as our own, we have hereto affixed our signatures in the presence of two witnesses.

WILLIAM J. KIRKPATRICK.
GEORGE W. FARLEY.

Witnesses:
W. H. HOLCOMB,
E. S. BALLARD.